US005275313A

United States Patent [19]

Petrillo et al.

[11] Patent Number: 5,275,313

[45] Date of Patent: Jan. 4, 1994

[54] CHEMICAL DISPENSER HAVING AN EXTERIAL CONNECTING APPARATUS WITH A QUICK DISCONNECT ASSEMBLY

[75] Inventors: Steven J. Petrillo, Oak Ridge; Daryl Reigel, Morris Plains, both of N.J.

[73] Assignee: Ashland Oil, Inc., Columbus, Ohio

[21] Appl. No.: 832,864

[22] Filed: Feb. 7, 1992

[51] Int. Cl.[5] ........................ B67C 9/00; F16L 37/08

[52] U.S. Cl. .................................. 222/377; 222/382; 222/464

[58] Field of Search ............... 222/157, 373, 377, 382, 222/464, 481, 482; 137/614.04

[56] References Cited

U.S. PATENT DOCUMENTS

| | | | |
|---|---|---|---|
| 1,594,163 | 7/1926 | Fenton | 222/382 X |
| 2,108,714 | 2/1938 | Hirsch et al. | 137/614.04 |
| 2,449,119 | 9/1948 | Holicer | 222/482 X |
| 2,478,760 | 8/1949 | Holicer | 222/482 X |
| 3,167,221 | 1/1965 | Feinstein et al. | 222/481 |
| 4,548,344 | 10/1985 | Hestehave et al. | 222/382 X |
| 4,630,759 | 12/1986 | Dawn | 222/382 X |
| 4,827,977 | 5/1989 | Fink, Jr. | 137/614.04 |
| 4,949,878 | 8/1990 | Jacobi | 222/382 |
| 5,083,686 | 1/1992 | Cady et al. | 222/464 |
| 5,141,014 | 8/1992 | Poli et al. | 137/614.04 X |

FOREIGN PATENT DOCUMENTS

| | | | |
|---|---|---|---|
| 1146512 | 3/1969 | Canada | 222/377 |
| 8806693 | 9/1988 | World Int. Prop. O. | 222/464 |

*Primary Examiner*—Andres Kashnikow
*Assistant Examiner*—Anthoula Pomrening
*Attorney, Agent, or Firm*—David L. Hedden

[57] ABSTRACT

This invention relates to a chemical dispenser comprising (a) a container, (b) a mechanical metering pump, and (c) an external connecting apparatus for connecting the container to the mechanical metering pump. The invention also relates to a method for dispensing chemicals which enables the user to return, refill, reuse the container which is easily drained and cleaned by the supplier of the liquid chemical. This enables the user to safely and efficiently use the liquid chemicals without creating waste and stress to the environment which results when container disposal is required.

1 Claim, 3 Drawing Sheets

CHEMICAL DISPENSER HAVING AN EXTERIAL CONNECTING APPARATUS WITH A QUICK DISCONNECT ASSEMBLY

BACKGROUND OF THE INVENTION

This invention relates to a chemical dispenser comprising (a) a container, (b) a mechanical metering pump, and (c) a means for connecting the container to the mechanical metering pump. The invention also relates to a method of dispensing chemicals using the chemical dispenser.

SUMMARY OF THE INVENTION

The invention is a chemical dispenser comprising (a) a container, (b) a mechanical metering pump, and (c) a external connecting apparatus for connecting the container to the mechanical metering pump. The chemical dispenser enables the user to return, refill, and reuse the container which can be easily drained and cleaned by the supplier of the liquid chemical. This enables the user to safely and efficiently use the liquid chemicals without creating waste and stress to the environment which results when container disposal is required.

A preferred embodiment of the invention is a chemical dispenser comprising:

A. a container which comprises: a vessel for holding a liquid chemical, said vessel having a top, an enclosed bottom and enclosed sides;
  (1) said top of said vessel comprising:
    (a) a center bung assembly through which a liquid chemical is dispensed; said center bung assembly comprising:
      (i) a male flared tubing connection; and
      (ii) a vacuum breaker;
    (b) a fill bung with a removable seal where liquid chemicals can be added to the container;
    (c) a drain with a removable seal where liquid chemicals can be removed f rom the container; and
    (d) a removable cover for said center bung assembly;
  (2) said bottom of said vessel comprising a sump where liquid chemicals are collected;
  (3) chimes at the top and bottom of said vessel; and
  (4) an internal suction assembly connected to said center bung assembly comprising:
    (a) a foot check valve assembly; and
    (b) tubing which connects said foot valve assembly to said center bung assembly;

B. a mechanical metering pump for withdrawing chemicals from the container for dispensing;

C. an external connecting apparatus for connecting said center bung assembly of the container to the mechanical metering pump, said external connecting apparatus comprising:
  (1) female flared tubing connected to said center bung assembly wherein said female flared tubing is partially or totally surrounded by a locking collar;
  (2) a dry break quick disconnect assembly containing a release tab, said dry break quick disconnect assembly having compression fittings at each end with internal check valves, said compression fittings being connected by tubing to said female flared tubing at one end and said mechanical metering pump at the other end.

The invention also relates to a method for dispensing chemicals which enables the user to return, refill, reuse the container which is easily drained and cleaned by the supplier of the liquid chemical. This enables the user to safely and efficiently use the liquid chemicals without creating waste and stress to the environment which results when container disposal is required.

DETAILED DESCRIPTION

Figure 1:
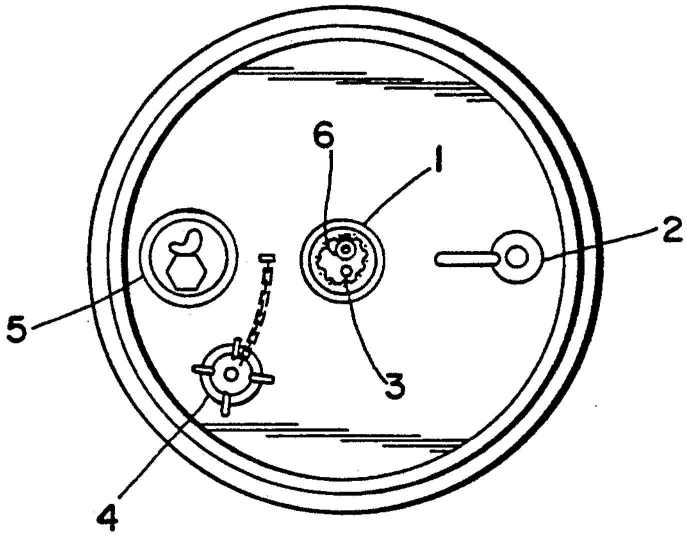
FIG. 1 illustrates a top plan of a container.

FIG. 1 illustrates the top plan view of a container which contains a center bung assembly 1, drain with removable cap 2, vacuum breaker 3, center bung cover with tether 4, sealed fill bung 5, and male flared tubing connection 6. Essentially, chemicals are pumped into the container through the fill bung 5 and withdrawn through the center bung assembly 1. The cover 4 of the center bung 1 is removed to increase the pressure when liquid chemicals are withdrawn from the container and to vent gases which might accumulate in the container. The male flared tubing connection 6 of the center bung assembly permits chemicals to be suctioned from the container for use.

The center bung assembly 1 comprises a male threaded opening 6 located near the center of said vessel which connects to tubing which carries the chemical liquid out of said vessel for dispensing. The center bung assembly also contains a vacuum breaker 3, apart from opening 6, preferably a gortex membrane, which allows air in or out, but is impervious to liquid.

Figure 2:
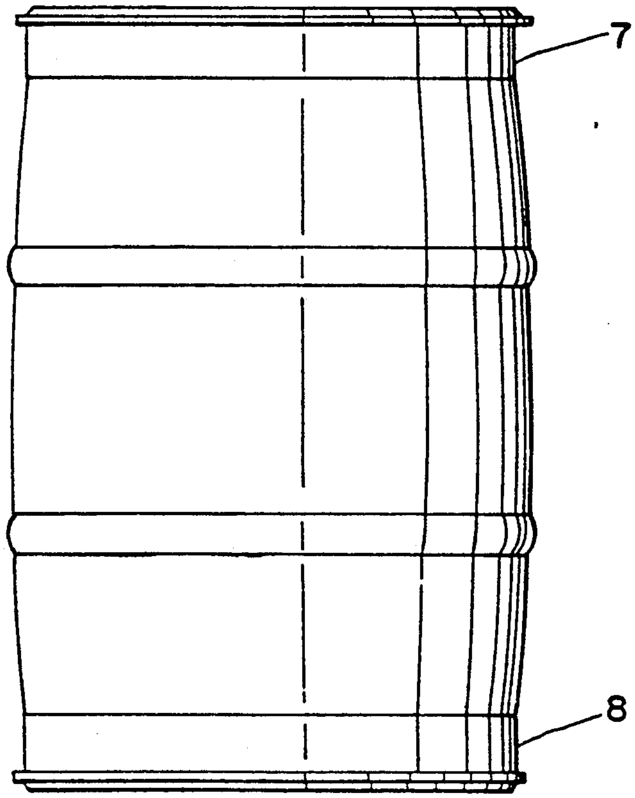
FIG. 2 illustrates a side elevation view of a container.

FIG. 2 is a side elevation view of a container. The top chime 7 provides support for the container and a place for gripping the container when lifting and moving it. The bottom chime provides support for the container and a level surface which is needed in order to counteract the unevenness in the bottom of the container due to the sump 9 shown in FIG. 3.

Figure 3:
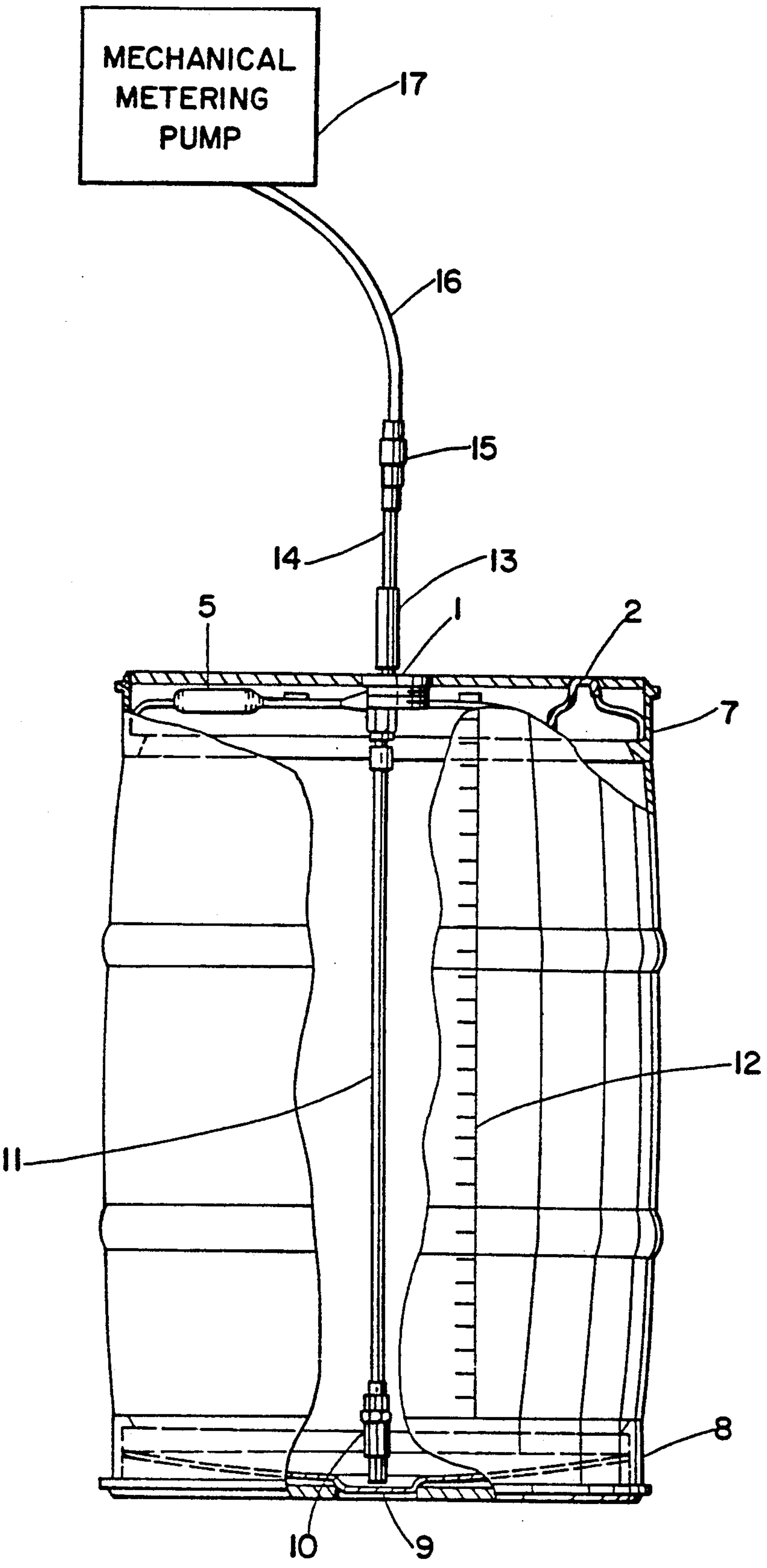
FIG. 3 illustrates a side elevation view of a container broken away to reveal the internal and external connecting elements of the dispenser.

FIG. 3 is a side elevation view broken away to reveal internal and external connecting elements of the container. The rigid tubing 11 connects the foot check valve assembly 10 to the center bung assembly 1. The female flared tubing with locking collar 13 connects to the center bung assembly 1 at one end and to tubing 14 at the other end which is connected to the dry break quick disconnect assembly 15. Chemicals are withdrawn through tubing 16 by a mechanical metering pump 17 through which they are dispensed at a rate and in an amount suitable for the application. The container also contains a bottom sump 9 which collects a liquid chemical and allows for easier dispensing of the chemicals. The container may also contain a volumetric indicator 12 which can be easily read.

Figure 4:
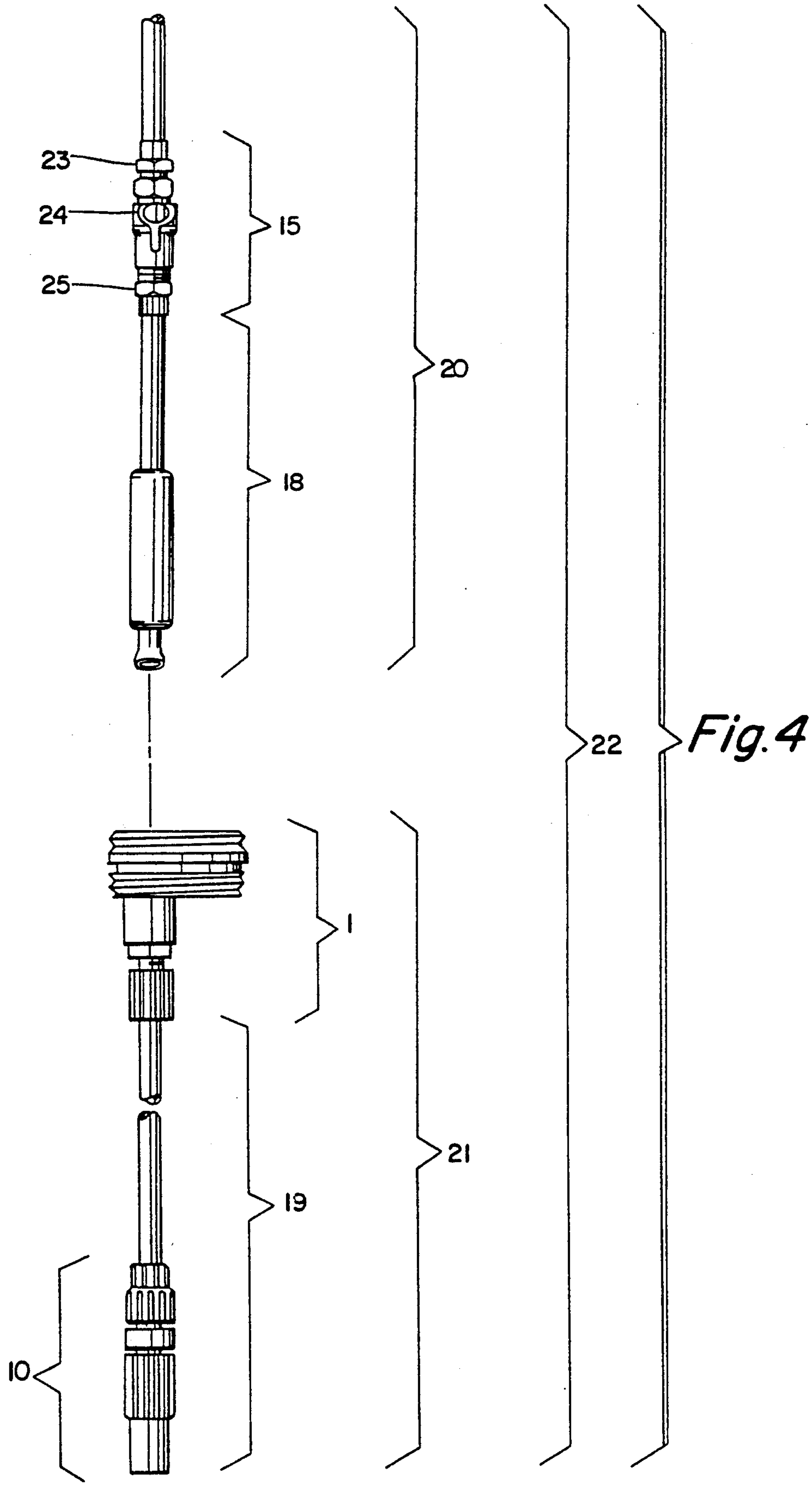
FIG. 4 illustrates a side elevation view of internal and external connecting elements exploded to show detail.

FIG. 4 illustrates a side elevation view of internal and external connecting elements exploded to show details of the internal and external connecting apparatus 22 comprising an external connecting assembly 20 and an internal connecting apparatus 21.

The external connecting apparatus comprises an external suction assembly 18 and a dry break quick disconnect assembly 15. The external suction assembly comprises female flared tubing 14 (FIG. 3) partially or totally surrounded by a locking collar 13 (FIG. 3). The external connecting apparatus is connected to the center bung assembly 1 by the female flared tubing 14 (FIG. 3) and locking collar 13 FIG. 3.

Tubing 14 (FIG. 3) from the flared locking collar connects the suction tube assembly to the dry break quick disconnect assembly 15 which includes compression fittings, 23 and 25, having internal check valves, and a release tab 24. The internal check valves provide a leakfree connection which allows flow of the chemical liquid when connected and prevents flow when disconnected. The dry break quick assembly is connected to the mechanical metering pump 17 by tubing 16 (FIG. 3).

The internal connecting apparatus 21 comprises an internal suction assembly 19 and the center bung assembly 1. The internal suction assembly comprises a foot check valve assembly 10, which prevents reverse flow, and tubing 11 (FIG. 3) which connects the internal suction assembly to the center bung assembly 1.

Liquid chemicals are withdrawn from the container and dispensed by applying suction with the mechanical metering pump 17. This withdraws liquid chemicals from the sump 9 through the internal suction assembly 19, which contains the foot check valve 10, to the center bung assembly 1 where they flow through the external connecting apparatus 20 to the mechanical metering pump 17 where they are dispersed.

Liquid chemicals which are dispensed from the containers preferably have viscosities such as from 100 to 300 centipoise. Examples of such liquid chemicals are corrosion inhibitors, microbiocides, deposit control agents, and antifoulants.

The containers are made from durable, leakproof materials such as high density polyethylene. The containers are preferably transparent, translucent, or white and contain a volumetric indicator which can be read by the unaided eye. The containers preferably meet D.O.T. SPEC 34 and U.N. Regulations. Generally, the containers are barrel-shaped and have a diameter of 22" to 24" and height of 36" to 38".

As preferred embodiment, a 55 gallon drum, made of high density polyethylene, having diameter of 23.12 inches and a height of 37.68 inches is made as described in FIGS. 1-4. PERFORMAX® 401 Cooling Water Treatment is pumped from a storage tank through a hose into the drum through the fill bung at the top of the drum. After the drum is filled, the hose from the pump is removed and the bung f ill is sealed. The drum is delivered to the site where it will be used.

At the site, a pump with a metering device and dispenser is connected to the drum by means of the external connecting apparatus 20 described in FIG. 4. PERFORMAX TM 401 water cooling treatment is withdrawn from the sump through the internal suction assembly 19 and external connecting apparatus 20 and dispersed from the drum by the mechanical metering pump 17 from the drum until is empty. The external connecting apparatus 20 is then removed from the drum and the center bung assembly 1 is re-capped. The drum is then removed from the site and returned to manufacturing site where is refilled with PERFORMAX® 401 Water Cooling Treatment and ready for reuse.

We claim:

1. A chemical dispenser comprising:

A. a container which comprises: a vessel for holding a liquid chemical, said vessel having a top, an enclosed bottom and enclosed sides;
   (1) said top of the vessel comprising:
      (a) a center bung assembly through which a liquid chemical is dispensed; said center bung assembly comprising:
         (i) a male flared tubing connection; and
         (ii) a vacuum breaker;
      (b) a fill bung with a removable seal where liquid chemicals can be added to the container;
      (c) a drain with a removable seal where liquid chemicals can be removed from the container; and
      (d) a removable cover for said center bung assembly;
   (2) said bottom of said vessel comprising a sump where liquid chemicals are collected;
   (3) chimes at the top and bottom of said vessel; and
   (4) an internal suction assembly connected to said center bung assembly comprising:
      (a) a foot valve assembly; and
      (b) tubing which connects said foot valve assembly to said center bung assembly;

B. a mechanical metering means for withdrawing chemicals from the container for dispensing;

C. an external connecting apparatus for connecting said center bung assembly of the container to the mechanical metering means, said external connecting apparatus comprising:
   (1) female flared tubing connected to said center bung assembly wherein said female flared tubing is partially or totally surrounded by a locking collar;
   (2) a dry break quick disconnect assembly containing a release tab, said dry break quick disconnect assembly having compression fittings at each end with internal check valves, said compression fittings being connected by tubing to said female flared tubing at one end and said mechanical metering means at the other end.

* * * * *